June 29, 1948.
E. J. SHIMEK
2,444,380
PIPE JOINT CONNECTION
Original Filed May 14, 1940
4 Sheets-Sheet 1
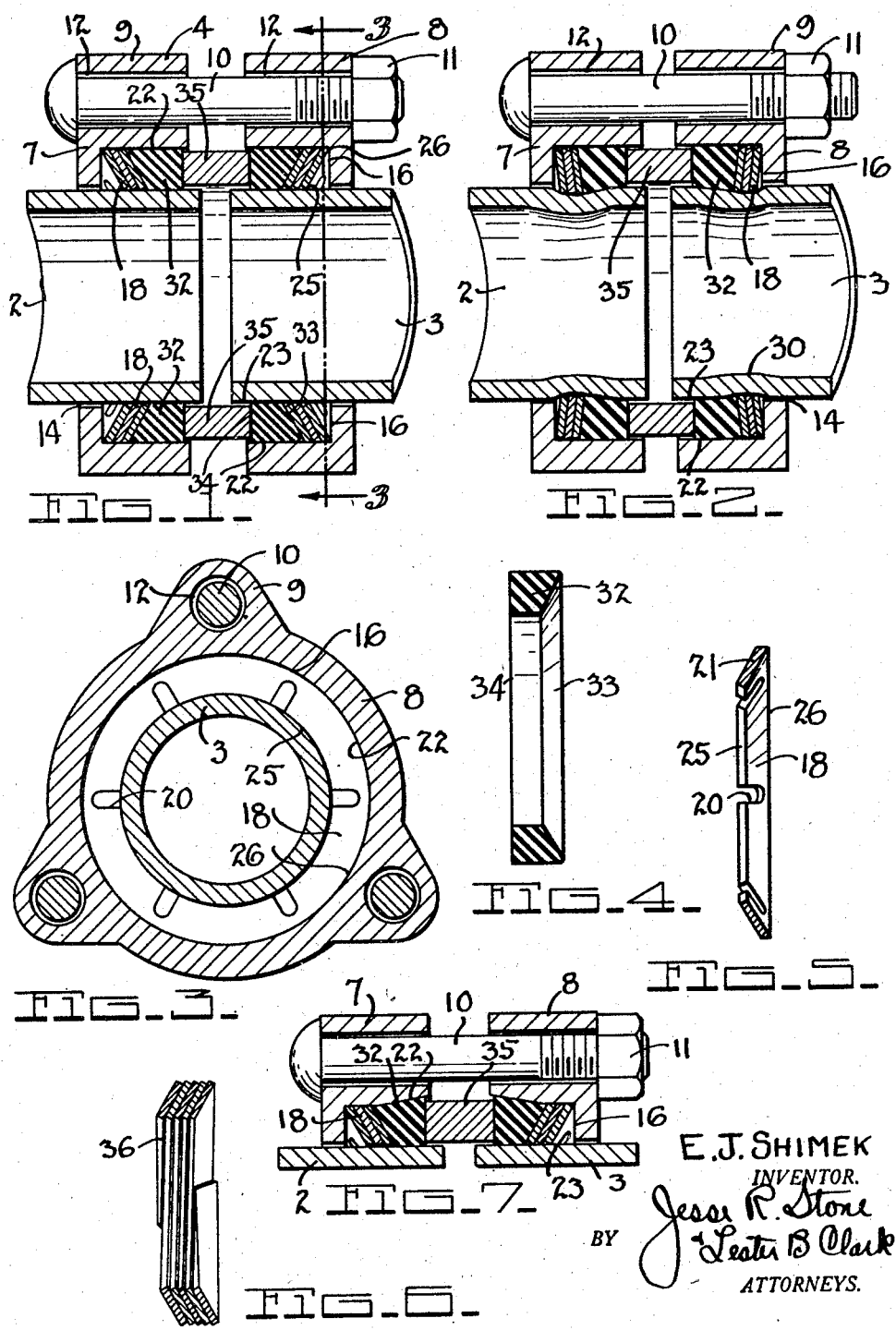
E. J. SHIMEK
INVENTOR.
BY Jesse R. Stone
Lester B Clark.
ATTORNEYS.

June 29, 1948. E. J. SHIMEK 2,444,380
PIPE JOINT CONNECTION

Original Filed May 14, 1940 4 Sheets-Sheet 2

E. J. SHIMEK
INVENTOR.
BY Jesse R. Stone
Lester B Clark
ATTORNEYS.

June 29, 1948.  E. J. SHIMEK  2,444,380
PIPE JOINT CONNECTION

Original Filed May 14, 1940  4 Sheets-Sheet 3

E. J. SHIMEK
*INVENTOR.*

BY Jesse R. Stone
Lester B. Clark
*ATTORNEYS.*

June 29, 1948. E. J. SHIMEK 2,444,380
PIPE JOINT CONNECTION
Original Filed May 14, 1940 4 Sheets-Sheet 4
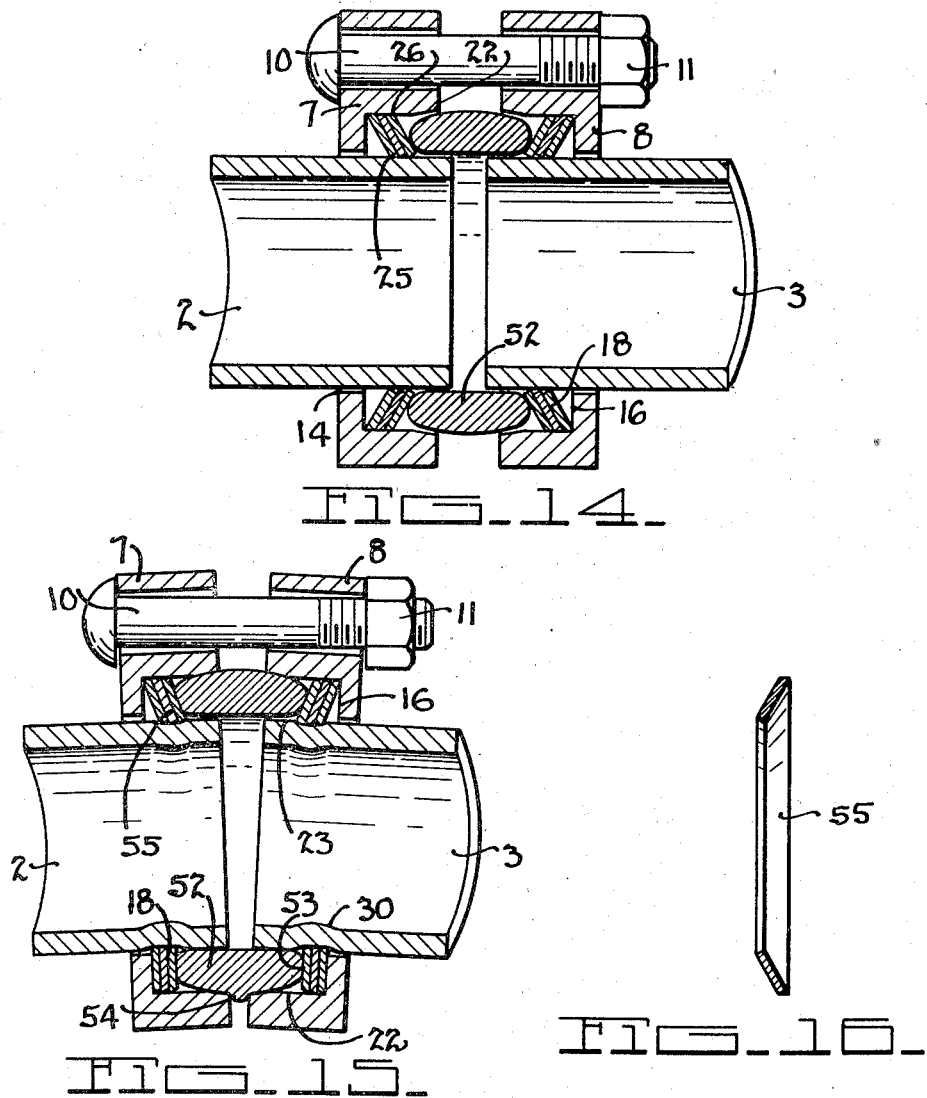

Patented June 29, 1948

2,444,380

UNITED STATES PATENT OFFICE 2,444,380

PIPE JOINT CONNECTION

Edwin J. Shimek, Dallas, Tex., assignor of one-half to Herbert Allen, Houston, Tex.

Original application May 14, 1940, Serial No. 335,098. Divided and this application July 5, 1943, Serial No. 493,540

8 Claims. (Cl. 285—132)

The invention relates to a pipe or rod joint connection and seal wherein it is intended that the joint can be simply and economically constructed and can be quickly assembled and disassembled while providing a gripping connection which will also form a seal.

It is one of the objects of the invention to provide a pipe or rod joint connection wherein inclined gripping members are adapted to be tilted or canted in order to effect a gripping action upon the pipe.

Another object of the invention is to provide a pipe joint wherein relatively movable members are arranged to effect a gripping of the pipe as the joint is affixed in position.

Another object of the invention is to provide a joint wherein plain end pipe may be inserted into the connection and the connection may be manipulated to effect gripping so that the pipe can not be removed and at the same time a seal will be provided.

Still another object of the invention is to provide a set or series of frusto-conical plates or members which are adapted to be canted toward a flattened position in order to set up a wedging action between the support for the members and the periphery of the pipe or rod being gripped.

Still another object of the invention is to provide the combination of sets of gripping rings, sealing rings and spacer rings so as to grip and seal a pair of plain rod or pipe ends.

Still another object of the invention is to provide a pipe gripping assembly wherein a tapered recess serves to increase the sealing action as the joint is tightened.

Another object of the invention is to provide a combination gripping and sealing ring for pipe joints wherein inclined discs will be canted to effect the gripping action.

Still another object of the invention is to provide a pipe joint wherein dished grip rings will be canted by the provision of a deformable spacer ring.

This application is a division of my prior copending application, Serial No. 335,098, filed May 14, 1940, now abandoned, for a Pipe or rod joint connection or seal.

Other and further objects of the invention will be readily apparent when the following description is considered in connection with the accompanying drawings wherein:

Fig. 1 is a transverse sectional view of a pair of pipe ends which are to be connected and sealed and illustrating the assembly of the parts prior to tightening of the connection to grip the pipe.

Fig. 2 is a view similar to Fig. 1 but showing the connection as gripping the pipe and exaggerating the operation somewhat but showing the pipe surface as having been deformed somewhat due to the gripping action of the connection.

Fig. 3 is a section taken on the line 3—3 of Fig. 1 and illustrating one of the grip rings in end elevation.

Fig. 4 is a sectional view of the sealing or packing gasket or ring.

Fig. 5 is a section of one of the grip rings.

Fig. 6 is a sectional view of the grip rings made up in the form of a coil.

Fig. 7 shows a slightly modified form of the invention of Fig. 1 wherein the recess receiving the packing gasket is tapered so that additional sealing will be effected as the packing gasket is forced into the recess.

Fig. 14 is a sectional view wherein an all metal joint is provided with a deformable ring used as both a seal and a spacer.

Fig. 15 shows the construction of Fig. 14 in gripping position.

Fig. 16 is a section of a solid annular grip ring.

Figure 8:
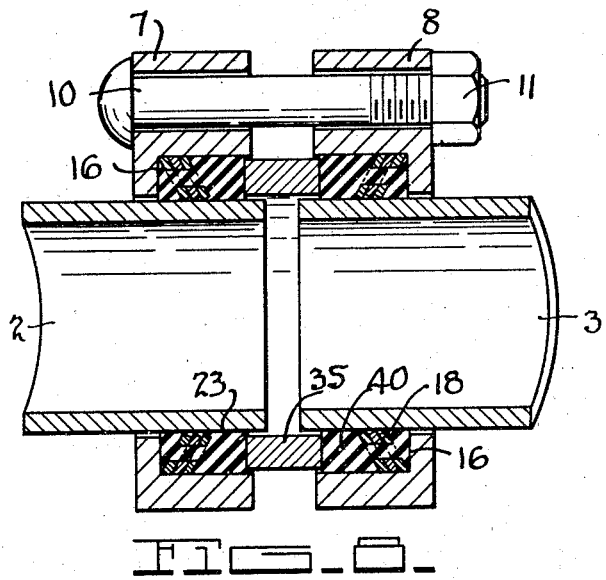
Fig. 8 is a view similar to Fig. 1 but illustrating a combination grip ring and sealing gasket made up as a unit.

In Fig. 1 the connection is shown as it is positioned on the pipe prior to being tightened and throughout the drawings wherein pipe ends have been illustrated it is to be understood that it is illustrative of the rods or other members which are to be connected.

The pipe ends to be connected are illustrated at 2 and 3 and may be threaded or of any type, but are preferably plain ends so that the cost of threading, flanging or otherwise forming the pipe for connection can be omitted. In other words, a pipe or rod may be cut off at any point and merely inserted in the connection and a seal made without cost or delay of preparing it for connection.

The connection is illustrated generally at 4 and is made up of two complementary housings 7 and 8. These housings are preferably of configuration shown in Fig. 3 wherein the ears 9 are arranged to receive the bolts 10. A nut 11 on the bolt tends to draw the two housings together because of the fact that the bolt passes through the openings 12 in the housings. These housings have an opening 14 therein which is of a size to receive the pipe end rather loosely therein. A recess 16 is provided in each of the housings 7 and 8. This recess is annular in its configuration, as seen in Fig. 3, and is arranged to receive a series of gripping rings 18. These rings are frusto-conical in shape, as best seen in Fig. 5, and are preferably of a suitable metal which will withstand a thrust along the inclined length or width of the ring.

The rings are dished and may have the slots 20 therein to allow for the collapsing movement. Particular attention is directed to the fact that the width 21 of these rings is intended to be greater than the distance from the inner periphery 22 of the recess to the outer periphery 23 of the pipe end so that the rings will be dropped into the recesses 16 and will take the position of Fig. 1. It seems obvious that if the inner edge 25 of each of these rings is held more or less stationary and in abutting relationship with the periphery 23 of the pipe, that if the outer edge 26 is moved toward the end of the pipe there will be a tendency to cant the ring or to flatten it out. Inasmuch as the housings 7 and 8 are of very sturdy construction the base 26 of the ring can not move outwardly and a reduction in the size of the central opening through the ring will occur. This causes the ring to flatten out and assume the position of Fig. 2, forcing the inner edge 25 of the ring against the periphery of the pipe and it is intended that where a series of rings are used they will be of sufficient strength to collapse the pipe, if necessary in forming a seal, as indicated by the bulge 30 in the pipe of Fig. 2.

This canting or tilting action of the ring is created by a tremendous leverage due to the provision of the bolts 10 to draw the two housings together. In order to hold the inner edges 25 of the rings against the periphery of the pipe and to also form a seal a packing or sealing ring or gasket 32 is deposited on top of the set of rings as seen in Fig. 1. This ring is shown in section in Fig. 4 and may be of any suitable rubber, packing, or sealing composition.

Each edge 33 of the ring is beveled to fit the inclination of the inner gripping ring and the opposite edge is flat at 34 to receive a spacer ring 35. This spacer ring is preferably of rigid material and of less thickness than either the gripping or the packing rings so that it will abut only the packing rings. With this construction the spacer and packing rings hold the grip rings in position as the bolts are tightened and the compression on the packing ring will cause it to seal along the periphery of the pipe, against the gripping rings and along the inner periphery 22 of the recess 16. In this manner a complete seal is provided about each pipe end and the sealing action in each of the two pipe ends will be identical because the spacer ring is floating on the two packings.

As the assembly is drawn up by tightening the nuts 11 on the bolts 10, as seen in Fig. 2, the inner edge of the grip ring will be held stationary while the housings are drawn toward each other. The only open space in the recess 16 is that area underneath the outermost dished gripping ring, so that as the inner edge of the rings grip the pipe and the housing moves forward there will be a tremendous turning moment applied to the outer edges of the rings, causing them to flatten out and to have the inner edge move inwardly to grip the pipe.

It seems obvious that the assembly can be very quickly applied and tightened to provide a firm gripping and sealing connection because the pipe ends need only to be inserted into the assembly and the bolts tightened, or one-half of the assembly passed over the edge of the pipe ends, and the spacer ring positioned as the pipe ends are brought adjacent to each other. The bolts can then be inserted and tightened up and in this manner both the gripping and the sealing connection is made. In event of leakage it is only necessary to tighten the bolts slightly so as to increase the sealing action and in this manner leakage can be entirely prevented with the connection.

Fig. 6 shows a slightly modified arrangement of the gripping rings wherein the individual rings are made in the form of a coil 36, the rings of which will be dished the same as the rings 18 and these rings may or may not have the slots 20 therein. It is intended that any desired number of independent rings 18, as in Fig. 5, or rings of the coil 36, as seen in Fig. 6, may be provided, depending upon the tension which is to be applied to the pipe ends and the amount of movement or sealing and gripping action which is desired.

Figures 9, 10:
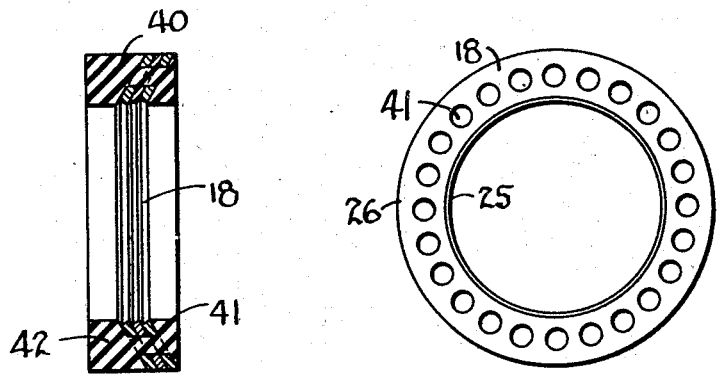
Fig. 9 is a section of the combination grip ring and seal.
Fig. 10 is an end view of Fig. 9.

Figs. 8, 9 and 10 show a construction which is identical with Fig. 1 except for the gripping and packing rings. In Fig. 9 a combination gripping and packing ring 40 has been provided in that a set of rings 18 have been provided with openings 41 therein, as seen in Fig. 10, and the rubber or other resilient composition 42 has been molded, vulcanized or formed with the gripping rings 18 therein. This construction is of advantage because it fills the recess 16 completely and the openings 41 allow for equalizing of the pressure on the seal ring on opposite sides of the grip rings, so that as the grip rings tilt to gripping position there can be a flow of the resilient material through the openings 41 to equalize the pressure. This will result in a seal at the base of the recess as well as along the pipe and against the spacer ring.

Figure 11:
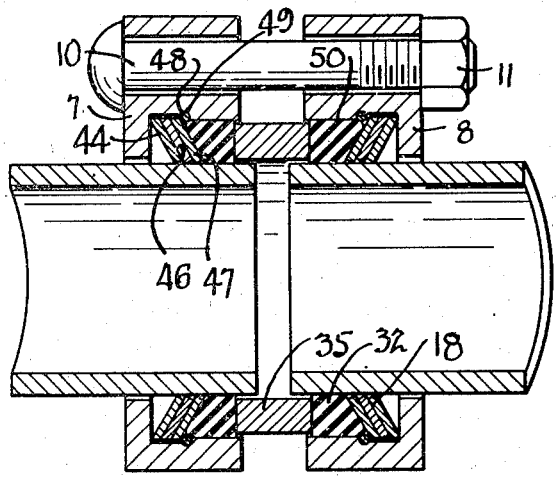
Fig. 11 is a transverse section similar to Fig. 1 illustrating a combination grip ring wherein the inner and outer rings may be in the form of an annular ring, whereas the intermediate rings will be made up of a plurality of segments confined by the end rings.
Figure 12:
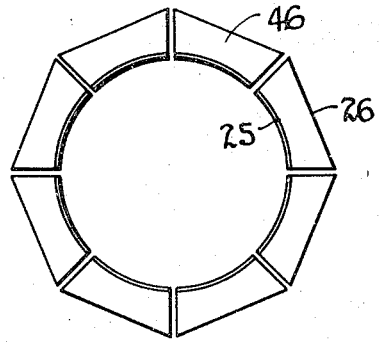
Fig. 12 shows a set of the segments used in Fig. 11.
Figure 13:
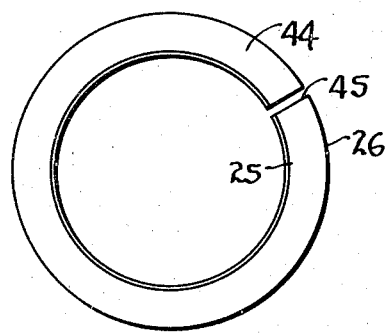
Fig. 13 shows one of the end rings used in Fig. 11.

Figs. 11, 12 and 13 show another modification of the gripping rings wherein the outer ring 44 is an annular ring, as seen in Fig. 13, and preferably has a single opening 45 therein, so that it will fit snugly within the recess in the housing. Disposed inside of the unitary ring 44 will be a series of segments 46, best seen in Fig. 12, and then an inner ring 47 similar to 44 will be placed on top of the series of segments. This top ring 47 will in turn be held in position by a spring snap ring 48 arranged to seat in a groove 49 in the recess 16. The periphery 50 of the recess is reduced somewhat to receive the sealing ring 32 and the spacer ring 35 is provided as in the previous forms. The advantage of the segments 46 is that they may tilt independently and any misalignment of the pipe ends will be absorbed by the tilting movement of the independent segments. These segments can tilt around the inner edge thereof as the housings collapse and will insure a uniform gripping action entirely around the pipe.

Figs. 14, 15 and 16 show another modification wherein the parts are the same as in Fig. 1, except that the seal ring 32 and the spacer ring 35 have been combined in a unitary ring 52, which is preferably of metal and constructed so as to be deformed slightly when the connection is tightened. Fig. 15 shows the edges 53 of the ring 52 as having been deformed due to the action in collapsing the gripping ring and the periphery at 54 has been forced inwardly between the housings. Fig. 15 particularly shows the pipe ends as misaligned and a ring of this sort is particularly adapted for connections where there may be a misalignment. It is intended that this deformable ring 52 can flow under pressure to create a seal with the housings, the pipe, and the rings, as best seen in Fig. 15. Solid rings 55 are preferably used with the deformable ring 52, so that there will be no escape for the deformable material into the ring.

While several forms of the invention have been illustrated it is to be understood that broadly the invention contemplates a combination gripping and sealing assembly wherein a housing is applied to the pipe ends and the rings moved into gripping action while confining a sealing material. The word "housing" is intended to broadly include the unit made up of one or more portions whereby the gripping and packing members are confined.

What is claimed is:

1. A pipe or rod joint and coupling including a pair of plain pipe ends to be connected, a housing to receive each end, a plurality of dished gripping rings having a periphery engaging in each housing and facing toward the pipe end, a sealing gasket abutting each set of said rings, a spacer member between the two gaskets, and means to draw the two housings together so that the gaskets and housings will tilt the gripping rings in said housing and force them into engagement with the pipe to clamp the pipe end against withdrawal.

2. A pipe or rod joint and coupling connection including a pair of plain pipe ends to be connected, an annular housing portion slipped over each end, an annular recess in each housing facing toward the pipe end, a plurality of annular dished gripping rings disposed in the base of each recess with the dished surface facing the base of the recess, an annular sealing gasket disposed in the recess in each housing, an annular dished face thereon to abut the outermost dished ring, a spacer member comprising a ring which is rectangular in section disposed between the two gaskets and abutting the outer faces thereon and spaced radially of the joint between the pipe ends, and means to draw said housings toward each other so that each housing is forced against the outer dished edge of the rings so as to force the inner edge against the gaskets which are held in position by said spacer so that the pressure tends to flatten said rings to grip the pipe.

3. A pipe or rod joint and coupling including a pair of pipe ends to be connected, a housing to receive each end, a plurality of dished gripping rings in each housing facing toward the pipe end, a sealing gasket abutting each set of said rings, a spacer member between the two gaskets, and means to draw the two housings together so that the gaskets will tilt the gripping rings in said housing and force them into engagement with the pipe to clamp the pipe end against withdrawal and simultaneously therewith compress said sealing gaskets to create and maintain a seal with the pipe and spacer to prevent leakage.

4. A pipe joint including a pair of pipe ends, an annular housing slipped onto each pipe end, and having a recess in each, a plurality of inclined annular rings disposed in each of the housing recesses, a sealing gasket abutting the rings, and a circular spacer block disposed between the two gaskets and spanning the space between the pipe ends, and means to effect relative movement of the two housings toward each other while the pipe ends remain stationary so as to tilt said rings to compress said gaskets against said spacer and to cause said rings to grip the pipe ends.

5. A pipe joint including a pair of pipe ends, an annular housing slipped onto each pipe end, and having a recess in each, a plurality of inclined annular rings disposed in each of the housing recesses, a sealing gasket abutting the rings, and a spacer block disposed between the two gaskets and spanning the space between the pipe ends, and means to effect relative movement of the two housings toward each other while the pipe ends remain stationary so as to tilt said rings to compress said gaskets against said spacer and to cause said rings to grip the pipe ends, said gasket and rings for each housing being molded together as an integral unit of rubber and metal with the metal exposed radially on the inside and outside of the rubber.

6. A pipe joint including a pair of pipe ends, an annular housing slipped onto each pipe end, and having a recess in each, a plurality of inclined annular rings disposed in each of the housing recesses, a sealing gasket abutting the rings, and a spacer block disposed between the two gaskets and spanning the space between the pipe ends, and means to effect relative movement of the two housings toward each other while the pipe ends remain stationary so as to tilt said rings to compress said gaskets against said spacer and to cause said rings to grip the pipe ends, said housing recesses being tapered to effect a compressive action on the rubber as the housing moves thereover.

7. A pipe joint including a pair of pipe ends, an annular housing slipped onto each pipe end, and having a recess in each, a plurality of inclined annular rings disposed in each of the housing recesses, a sealing gasket abutting the rings, and a spacer block disposed between the two gaskets and spanning the space between the pipe ends, means to effect relative movement of the two housings toward each other while the pipe ends remain stationary so as to tilt said rings to compress said gaskets against said spacer and to cause said rings to grip the pipe ends, and a sealing packing ring disposed between adjacent grip rings.

8. A pipe joint including a pair of plain pipe ends, an annular recessed housing slipped onto each pipe end, a plurality of dished gripping rings in each recess, and a spacer ring of deformable metal disposed between the rings of the two housings and bearing against the outer surface of the rings inwardly of the periphery thereof, and means to pull said housings together to tend to flatten said rings against said spacer so as to force the rings to grip the pipe ends, and to deform the spacer into engagement with each of the housings and the pipe ends.

EDWIN J. SHIMEK.

REFERENCES CITED

The following references are of record in the file of this patent:

UNITED STATES PATENTS

| Number | Name | Date |
| --- | --- | --- |
| 1,440,207 | Burns | Dec. 26, 1922 |
| 1,813,529 | Clark | July 7, 1931 |
| 2,230,725 | Nathan | Feb. 4, 1941 |
| 2,341,164 | Shimek | Feb. 8, 1944 |